United States Patent
Murakami et al.

(10) Patent No.: US 8,510,933 B2
(45) Date of Patent: Aug. 20, 2013

(54) METHOD OF MANUFACTURING A FIELD POLE MAGNET

(75) Inventors: Ryou Murakami, Yokohama (JP);
Hideki Nishimura, Ebina (JP); Nobuo Kino, Chita (JP); Tomihito Hashimoto, Tokyo (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 42 days.

(21) Appl. No.: 13/122,032

(22) PCT Filed: Sep. 29, 2009

(86) PCT No.: PCT/JP2009/066967
§ 371 (c)(1),
(2), (4) Date: May 2, 2011

(87) PCT Pub. No.: WO2010/038748
PCT Pub. Date: Apr. 8, 2010

(65) Prior Publication Data
US 2012/0036696 A1    Feb. 16, 2012

(30) Foreign Application Priority Data
Oct. 2, 2008  (JP) ................................. 2008-257261

(51) Int. Cl.
*H01F 7/06*  (2006.01)

(52) U.S. Cl.
USPC ................. 29/607; 29/417; 29/428; 310/152; 335/296; 335/306

(58) Field of Classification Search
USPC ................... 29/417, 428, 607; 310/152, 216; 335/296, 306
See application file for complete search history.

(56) References Cited

U.S. PATENT DOCUMENTS

| | | | | |
|---|---|---|---|---|
| 5,315,244 A | * | 5/1994 | Griebeler | 324/207.21 |
| 5,654,603 A | * | 8/1997 | Sung et al. | 310/214 |
| 6,336,989 B1 | * | 1/2002 | Aoki et al. | 156/275.7 |
| 6,369,571 B1 | * | 4/2002 | Damadian et al. | 324/318 |
| 6,634,089 B1 | * | 10/2003 | Aoki et al. | 29/607 |
| 6,848,170 B1 | * | 2/2005 | Damadian et al. | 29/607 |
| 7,127,802 B1 | * | 10/2006 | Damadian et al. | 29/607 |
| 7,345,560 B2 | * | 3/2008 | Laskaris et al. | 335/284 |
| 7,586,226 B2 | | 9/2009 | Kihara | |
| 7,796,002 B2 | * | 9/2010 | Hashimoto et al. | 335/306 |
| 2008/0036324 A1 | | 2/2008 | Kiharaa | |

FOREIGN PATENT DOCUMENTS

| | | |
|---|---|---|
| EP | 0 026 014 A1 | 4/1981 |
| EP | 0 996 212 A1 | 4/2000 |
| EP | 1 786 085 A2 | 5/2007 |
| GB | 859862 A | 1/1961 |
| JP | 11-252833 A | 9/1999 |
| JP | 2001-136692 A | 5/2001 |
| JP | 2005-354899 A | 12/2005 |
| JP | 2008-43124 A | 2/2008 |

OTHER PUBLICATIONS

Japanese Office Action and English language translation dated Mar. 5, 2013 (4 pages).

* cited by examiner

*Primary Examiner* — Paul D Kim
(74) *Attorney, Agent, or Firm* — Foley & Lardner LLP

(57) ABSTRACT

Provided is a field pole magnet to be installed in a rotor or a stator of a permanent magnet rotary machine, the field pole magnet including: multiple magnet pieces (31 to 34) formed by breaking and dividing a single permanent magnet; and at least one magnet-piece holding member (40) configured to hold these magnet pieces (31 to 34).

7 Claims, 8 Drawing Sheets

METHOD OF MANUFACTURING A FIELD POLE MAGNET

TECHNICAL FIELD

The present invention relates to: a field pole magnet to be installed in a rotor or a stator of an electric motor, an electric generator, or the like; a method of manufacturing the field pole magnet; and a permanent-magnet rotary electric machine.

BACKGROUND ART

Japanese Patent Application Publication No. Hei 11-252833 discloses a field pole magnet for use in a permanent-magnet electric motor. The field pole magnet is a magnet including multiple magnet pieces separated in an axial direction or a circumferential direction of an iron core for the purpose of suppressing heat generation and entirely covered with an insulating layer while being insulated from one another. The field pole magnet is used by being inserted and embedded into each of multiple attachment holes provided respectively in multiple positions at intervals in a circumferential direction of the outer peripheral portion of the iron core of the permanent-magnet motor.

The above document has no description on a method of manufacturing the magnet pieces. However, in a conventionally known method of obtaining a field pole magnet, magnetic slices are produced either by cutting and dividing a magnet with a rotary blade or by power compression molding; and the thus-produced magnet slices are bonded together with an adhesive agent or the like with insulating layers interposed in between.

SUMMARY OF INVENTION

Technical Problem

The conventionally-known field pole magnet, however, has the following problems.
1) The insulating layers inserted between the magnet pieces are likely to cause deterioration in strength of bonding between the magnet pieces.
2) Since the dimensional error of the thickness of the insulating layers is added to the contour and dimensions of the field pole magnet at the time of insertion into the iron core, the dimensional tolerance cannot be made small.
3) Finishing processing for dimensional adjustment is required additionally after integration of the magnet pieces in order to solve the problem shown in 2) above, resulting in cost increase.
4) Since one insulating layer is required between each two magnet pieces, the providing of the insulating layers entails costs.
5) Since the broken surfaces are exposed, the broken surfaces are more likely to rust.

In view of the above, an objective of the present invention is to provide: a field pole magnet which can achieve reduction in production cost by simplifying a process of integrating magnet pieces and which requires no rust preventing process on broken surfaces; a method of manufacturing the field pole magnet; and a permanent-magnet rotary electric machine.

Solution to Problem

A first aspect of the present invention is a field pole magnet to be installed in a rotor or a stator of a permanent-magnet rotary electric machine, the field pole magnet which includes: multiple magnet pieces formed by breaking and dividing a single permanent magnet; and at least one magnet-piece holding member configured to hold the plurality of magnet pieces.

A second aspect of the present invention is a method of manufacturing a field pole magnet configured in such a manner that multiple magnet pieces formed by breaking and dividing a single permanent magnet are arranged side by side, the method which includes breaking and dividing a single permanent magnet while holding the single permanent magnet by at least one magnet-piece holding member.

A third aspect of the present invention is a permanent-magnet rotary electric machine, in which the field pole magnet is installed in a rotor or a stator.

DESCRIPTION OF EMBODIMENTS

Figure 1:
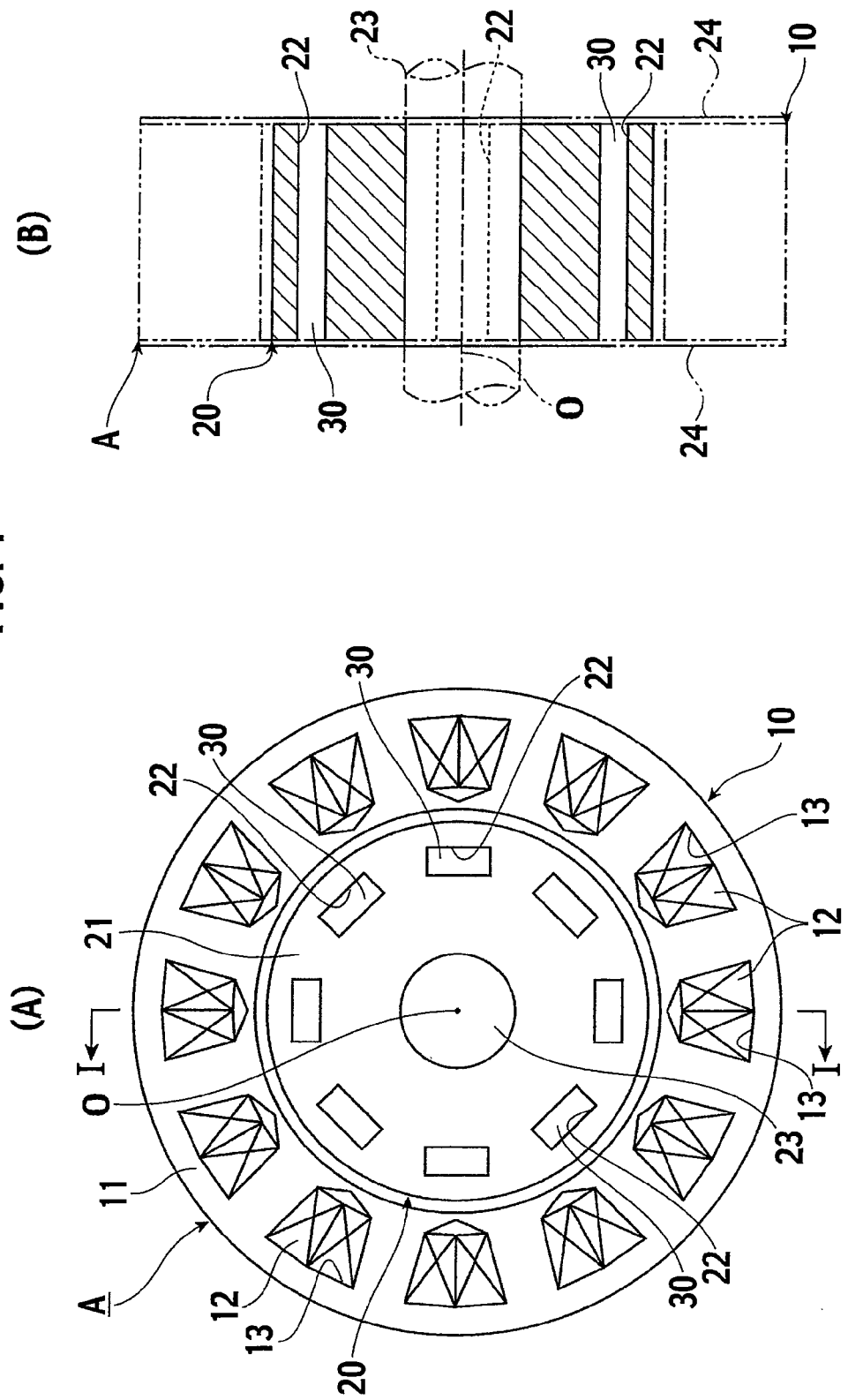
FIG. 1 illustrates a schematic configuration of a principal portion of a permanent-magnet motor to which a field pole magnet of a first embodiment of the present invention is applied, Part (A) is a front view thereof, and Part (B) is a cross-section of a rotor taken along a line I-I.

Hereinbelow, embodiments for carrying out the present invention will be described with reference to the drawings. FIG. 1 illustrates a schematic configuration of a principal portion of a permanent-magnet motor to which a field pole magnet of a first embodiment of the present invention is applied, Part (A) is a front view thereof, and Part (B) is a cross-section of a rotor taken along a line I-I. Note that in the embodiment, the description is given by taking a permanent-magnet motor as an example of a permanent-magnet rotary electric machine.

A permanent-magnet motor (hereinafter simply referred to as an "electric motor") A of an embodiment of the present invention mainly includes: an annular stator 10 which constitutes a part of a casing, which is not illustrated; and a columnar rotor 20 which is disposed coaxially with the stator 10.

The stator 10 includes a stator main body 11 and multiple coils 12 . . . . In the stator main body 11, coil holes 13 . . . in which to dispose the respective coils 12 . . . are formed at equiangular intervals on the same circumference around a shaft center O, the coil holes 13 . . . each having an almost trapezoidal shape in a front view. In other words, the coils 12 . . . are arranged at equiangular intervals on the same circumference around the shaft center O.

The rotor 20 includes a rotor main body 21 and multiple field pole magnets (hereinafter simply referred to as "field pole magnets") 30 . . . of the first embodiment.

In the rotor main body 21, fitting holes 22 . . . in which to insert and fit the respective field pole magnets 30 are formed at equiangular intervals on the same circumference around the shaft center O, the fitting holes 22 . . . each having a horizontally rectangular shape in a front view.

In other words, the field pole magnets 30 . . . are arranged at equiangular intervals on the same circumference around the shaft center O.

Note that: reference numeral 23 denotes a rotary shaft aligned with the shaft center O and coupled to the rotor main body 21; and reference numeral 24 denotes end plates disposed on the respective two surfaces of the stator 10.

Figure 2:
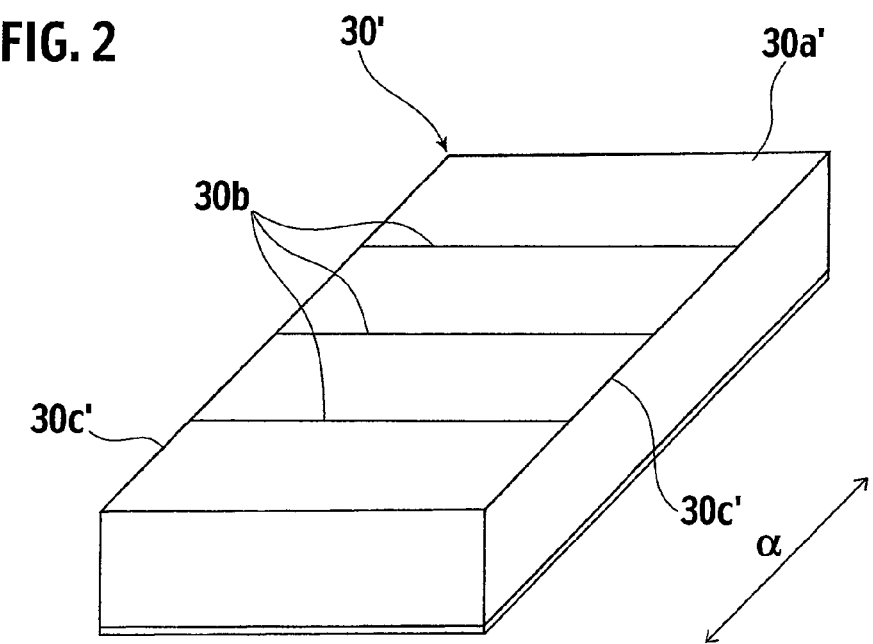
FIG. 2 is a perspective view of a permanent magnet having break slits formed on its top surface.
Figure 3:
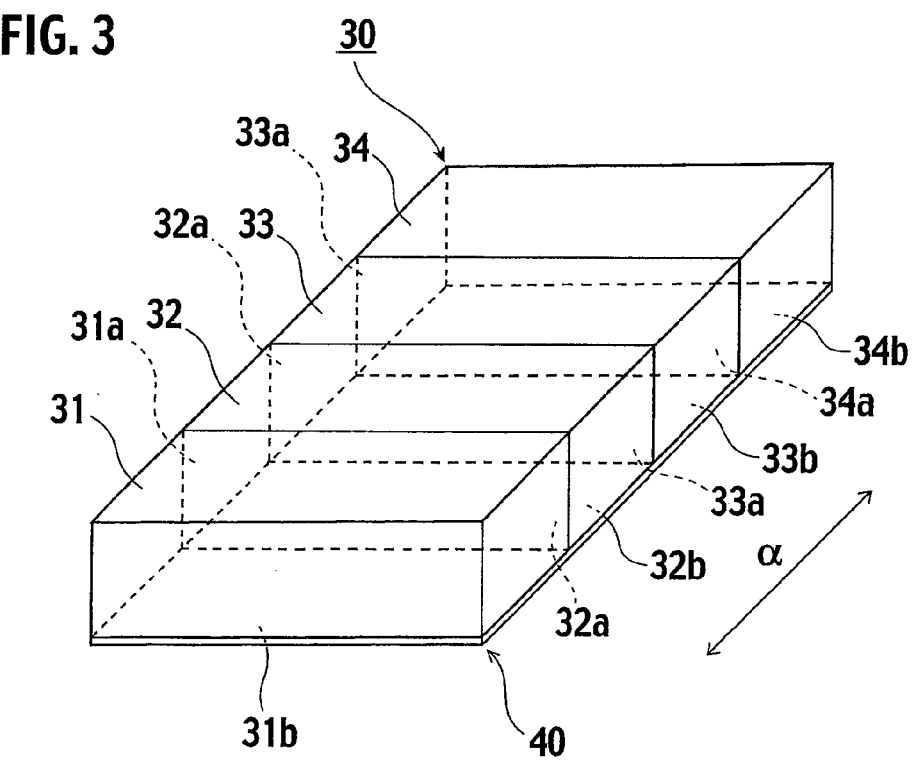
FIG. 3 is a perspective view of the field pole magnet of the first embodiment of the present invention.

FIG. 2 is a perspective view of a permanent magnet having break slits formed on its top surface. FIG. 3 is a perspective view of the field pole magnet of the first embodiment of the present invention.

A permanent magnet 30' illustrated in FIG. 2 is a neodymium-iron-boron (NdFeB) magnet which has a relatively low electric resistance, and is beforehand formed in a predetermined shape in order to be installed in the rotor 20 of the electric motor A.

In the embodiment, the permanent magnet 30' is formed in a rectangular parallelepiped whose cross section has the same shape and the same size as does the cross section of each fitting hole 22. To put it differently, the permanent magnet 30' is formed in a size which enables the permanent magnet 30' to be inserted and fitted into the corresponding fitting hole 22.

Although the NdFeB magnet is shown as an example, the permanent magnet 30' is not limited to this magnet. It is a matter of course that a SmCo magnet or the like, for example, may be employed.

On a top surface 30a' of the permanent magnet 30', break slits 30b . . . are formed at positions at which the permanent magnet 30' is broken and divided.

In the embodiment, the break slits 30b are formed at intervals which allow longitudinal sides 30c', 30c' of the permanent magnet 30' to be divided into equal quarters. In the embodiment, the break slits 30b are formed by glass cutting processing.

The formation of the above-described break slits 30b in the permanent magnet 30' enables the concentration of the stress applied during the breaking and dividing, and thus makes it easier to break and divide the permanent magnet 30' into a desired number of pieces at desired positions.

As illustrated in FIG. 3, the field pole magnet 30 includes: four magnet pieces 31 to 34 formed by breaking and dividing the single permanent magnet 30'; and a single magnet-piece holding member 40 configured to hold these magnet pieces 31 to 34.

The magnet pieces 31 to 34 have their broken surfaces 31a to 34a, which are exposed by breaking the permanent magnet 30', opposed to one another. In the embodiment, adjacent two of the broken surfaces 31a to 34a of the magnet pieces 31 to 34 obtained by breaking and dividing are in direct abutting contact with each other.

Figure 4:
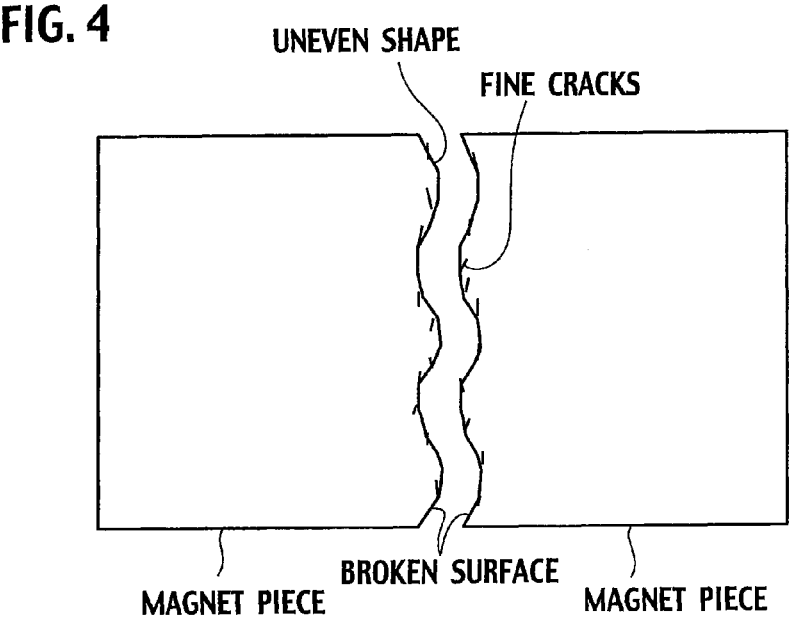
FIG. 4 is a cross-sectional view illustrating a division surface of a magnet which is broken and divided into pieces.

As a result of the breaking and dividing, each magnet piece has a large number of fine cracks on a top layer portion of each broken surface, as illustrated in FIG. 4. Moreover, the broken surfaces of each magnet piece are rough surfaces unlike cut surfaces of a magnet piece obtained by cutting and dividing. The breaking and dividing in this manner does not remove any portion, unlike the cutting and dividing by use of a rotary blade which removes cut portions as cut powder, for example. For this reason, the broken surfaces which constitute the division surface between each two adjacent magnet pieces are almost equivalent to those which were united together before the breaking.

Meanwhile, the electric resistance value between the broken surfaces 31a, 32a, for example, is set to be five or more times as high as the electric resistance value of the magnet pieces themselves per unit length of 1 cm in a direction perpendicular to the broken surfaces 31a, 32a.

Specifically, the electric resistance value between the respective broken surfaces 31a, 32a is set at 0.5 mΩ or higher.

The electric resistance values of the broken surfaces 31a, 32a is set in the following manner.

Firstly, for example, the broken surfaces 31a, 32a, which are adjacent when broken and divided, of the magnet pieces 31, 32 are brought into direct abutting contact with each other. Thus, a part or a whole of the regions of the broken surfaces are in direct contact with each other.

It is conceivable that: the contact resistance value between the broken surfaces which are in direct contact with each other are dependent on the real contact area between the broken surfaces; and the contact resistance value is proportional to the inverse number of the real contact area.

The real contact area is represented by the multiplication of the contact area and the number of contact points, which varies according to the mean curvature and the load of microprotrusions existing on the surfaces.

With these taken into consideration, in the embodiment, the electric resistance value between the broken surfaces 31a, 32a is set by increasingly and decreasingly changing the load acting on the broken surfaces.

"The direction perpendicular to the broken surfaces 31a, 32a" is a direction denoted by α in FIGS. 2 and 3. In other words, the direction perpendicular to the broken surfaces 31a, 32a is a direction parallel to the longitudinal sides 30c', 30c' illustrated in FIG. 2.

Note that the electric resistance value of the broken surfaces of the magnet pieces arranged side by side may be set to be 50 or more times as high as the electric resistance value of each magnet piece itself per unit length of 1 cm in the direction perpendicular to the broken surfaces. Specifically, the electric resistance value between the broken surfaces is set at 5 mΩ or higher. In this case, it is possible to obtain a heat generation suppressing effect which is equivalent to that obtained when the broken surfaces are fully insulated from each other.

The magnet-piece holding member 40 is a band-shaped member long and wide enough to be attached to the magnet pieces 31 to 34. The magnet-piece holding member 40 holds the magnet pieces 31a to 34a by being attached to portions of the magnet pieces 31 to 34 which are other than the broken surfaces 31a to 34a.

In the embodiment, the magnet pieces 31 to 34 each shaped like a quadrangular prism are formed by breaking and dividing the rectangular parallelepiped permanent magnet 30' in the above described manner. Thus, the magnet-piece holding member 40 is attached to given surfaces (undersurfaces in the drawing) 31b to 34b of the respective magnet pieces 31 to 34 which are among the surfaces perpendicular to the broken surfaces 31a to 34a.

The magnet-piece holding member 40 is an elastic and water-repellent tape having an adhesive agent layer formed on a top surface thereof, and is formed in the same shape as the outline of the given surfaces (under-surfaces in the drawing) 31b to 34b. In other words, the magnet-piece holding member 40 is bonded to the entire regions of the given surfaces (undersurfaces in the drawing) 31b to 34b.

Fluororesin, polyphenylene sulfide (PPS), polypropylene, polyester, or the like may be used as the elastic and water-repellent tape.

The following effects can be obtained from the field pole magnet of the embodiment.

It is possible to simplify a process of integrating the magnet pieces, and thus to achieve reduction in production cost.

The magnet pieces can be handled as an integrated magnet, because the given surfaces of the respective magnet pieces which are perpendicular to the broken surfaces are held by the magnet-piece holding member such as an adhesive tape. Thus, the magnet pieces can be easily inserted into a rotor or a stator.

The field pole magnet 30 can be kept in the same size as the permanent magnet 30' is before broken and divided, i.e., the field pole magnet 30 is divided into multiple magnet pieces by the breaking and dividing. For this reason, the broken surfaces after the division are almost equivalent to those which were united together before the breaking. That is to say, once adjacent broken surfaces concerning each division surface are joined together in the same directions as those before the division, the state which is almost the same as that exists before the division is reconstructed. By joining the broken surfaces together, the united field pole magnet can be formed in almost the same shape as the field pole magnet is before divided. This makes no longer necessary the finishing process for the field pole permanent magnet obtained after integrating the multiple divided magnet pieces together, and thus can achieve cost reduction. Moreover, when the multiple magnet pieces are together with their broken surfaces opposed to each other, the rough portions of the respective broken surfaces exert an action of positioning the magnet pieces to each other, and it is easy to perform the uniting operation. Further, unlike in the conventional case, the field pole magnet is no longer made large as a result of adding the dimensional errors which occur due to the insertion of the insulating layers and the division of the magnet into the multiple pieces.

In addition, the field pole magnet 30 can be easily inserted and fitted into the corresponding fitting hole 22 even when: the permanent magnet 30' is beforehand formed in the shape of the rectangular parallelepiped whose cross section has the same shape and the same size as does the cross section of the fitting hole 22 as described above; and the field pole magnet 30 is obtained by breaking and dividing the permanent magnet 30'.

Further, the electric resistance value between the broken surfaces of the respective magnet pieces is set to be five or more times as large as the electric resistance value of each magnet piece itself per unit length of 1 cm in the direction perpendicular to the broken surfaces, and specifically, the electric resistance value between the broken surfaces is set at 0.5 mΩ or higher. Thus, it is possible to reduce a value of the electric current flowing through the field pole magnet 30, as well as to suppress the heat generation thereof. Accordingly, the broken surfaces varying in shape need not be insulated fully.

Note that in a case of fully insulating the broken surfaces, the multiple divided magnet pieces may be integrated together by being united together by use of an insulating member. The insulating member includes: an adhesive agent; and an insulating inclusion to be mixed in the adhesive agent, the insulating inclusion being non-conductive particles (such as glass beads or ceramic particles, for example) functioning as a spacer. An epoxy resin or a silicone resin, for example, is used as the adhesive agent. The adhesive agent is used after the particles are mixed and stirred in the adhesive agent. The particles are thus dispersed entirely and mixed almost equally in the adhesive agent. As has been described above, the contact resistance between the magnet pieces increases, and eddy currents can be more securely separated between the magnet pieces, so that each eddy current circulates in a corresponding one of the divided magnet pieces. This can resultantly enhance the heat generation suppressing effect attributable to dividing the magnet into the multiple magnet pieces.

The configuration in which no pressure is directly applied between the divided pieces arranged side by side makes it possible to keep the interfacial contact resistance value between the magnet pieces high. Thus, it is possible to effectively suppress the heat generation due to the eddy currents produced by the magnet in the motor.

In addition, since the magnet-piece holding member 40 is bonded to the entire regions of the given surfaces 31b to 34b, the multiple magnet pieces can be handled as an integrated magnet, and at least the given surfaces can be made to have water-repellency. Thereby, moisture or the like which promotes corrosion can be prevented from penetrating into the broken surfaces from the given surfaces, and anti-corrosion characteristics thus can be provided to the magnet pieces.

Figure 5:
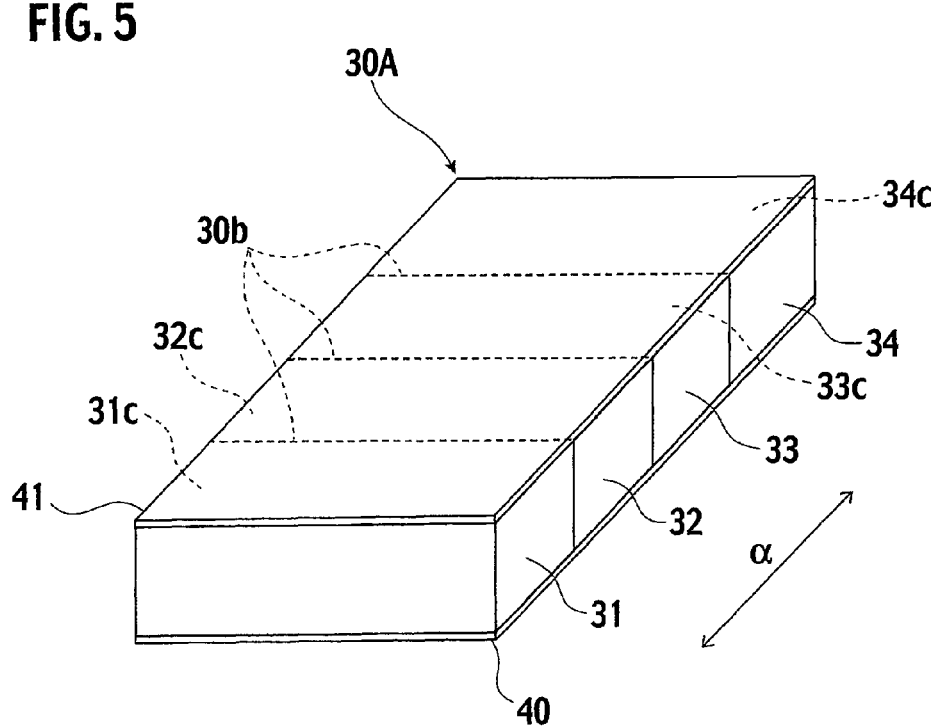
FIG. 5 is a perspective view of a field pole magnet of a second embodiment of the present invention.
Figure 6:
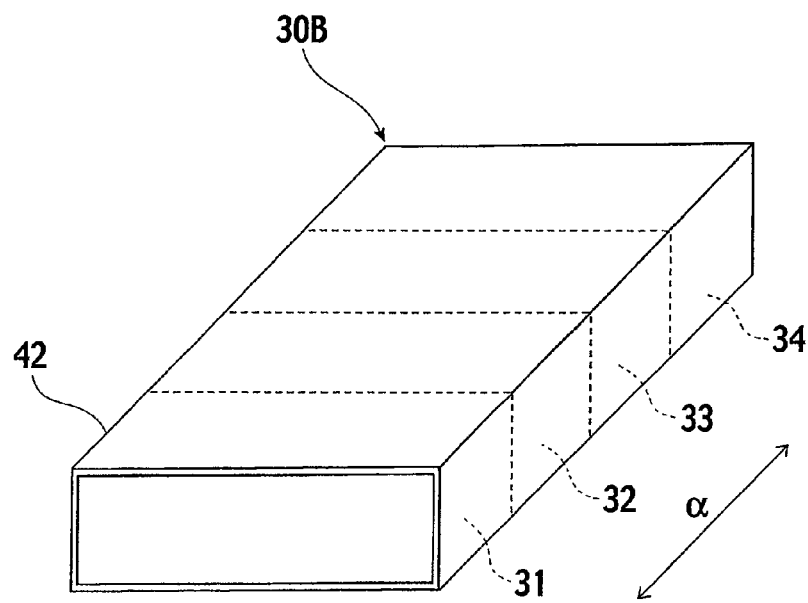
FIG. 6 is a perspective view of a field pole magnet of a third embodiment of the present invention.

Next, with reference to FIGS. 5 and 6, field pole magnets of to the respective second and third embodiments of the present invention will be described. FIG. 5 is a perspective view of a field pole magnet of the second embodiment of the present invention. FIG. 6 is a perspective view of a field pole magnet of the third embodiment of the present invention. Note that: components equivalent to those described in the above embodiment will be denoted by the same reference numerals; and descriptions for the components will be omitted.

As illustrated in FIG. 5, a field pole magnet 30A of the second embodiment of the present invention includes: four magnet pieces 31 to 34 formed by breaking and dividing a single permanent magnet; and two magnet-piece holding members 40, 41 configured to hold these magnet pieces 31 to 34.

The magnet-piece holding member 41 is equivalent to the magnet-piece holding member 40, and is attached to given surfaces (top surfaces in the drawing) 31c to 34c of the magnet pieces 31 to 34 which are among the surfaces perpendicular to the broken surfaces 31a to 34a.

Specifically, the magnet-piece holding members 40, 41 are respectively attached to two sides, i.e., the undersurfaces 31b to 34b in the drawing and the top surfaces 31c to 34c in the drawings.

In addition to the effect obtained from the field pole magnet of the first embodiment, this embodiment makes it possible to handle the multiple magnet pieces as an integrated magnet, and to cause at least two sides to have the water repellency, since the magnet-piece holding members 40, 41 are bonded to the entire regions of the undersurfaces 31b to 34b and the top surfaces 31c to 34c.

Thereby, moisture or the like which promotes corrosion can be prevented from penetrating into the broken surfaces from the two sides, and anti-corrosion characteristics thus can be provided to the magnet pieces.

Next, as illustrated in FIG. 6, a field pole magnet 30B of the third embodiment of the present invention includes: four magnet pieces 31 to 34 formed by breaking and dividing a single permanent magnet; and a single magnet-piece holding member 42 configured to hold these magnet pieces 31 to 34.

The magnet-piece holding member 42 is formed from a tubular heat-shrinkable film, and covers all the surfaces perpendicular to the broken surfaces 31a to 34a while being in close contact therewith. An olefin-based, ester-based, imide-based, or other thermoplastic resin, rubber, fluororesin, or the like may be used as the heat-shrinkable film.

In this embodiment, all the surfaces perpendicular to the broken surfaces are covered. This eliminates such a risk that the film is damaged by the excessive stress applied thereto when the magnet is inserted into the rotor or that gaps between the magnet pieces become uneven, and thereby makes the handling easy.

Since all the surfaces perpendicular to the broken surfaces are covered with the elastic film, the multiple magnet pieces can be handled as an integrated magnet. Further, because all the surfaces perpendicular to the broken surfaces are made to have the water repellency, moisture or the like which promotes corrosion can be prevented from penetrating into the broken surfaces, and anti-corrosion characteristics thus can be provided to the magnet pieces.

Furthermore, the use of the heat-shrinkable film can simplify the uniting of the magnet pieces.

A method of manufacturing the field pole magnet 30 of one embodiment of the present invention is related to the field pole magnet 30 having the configuration in which the four magnet pieces 31 to 34 formed by breaking and dividing the single permanent magnet 30' are arranged side by side, and is characterized in that the single permanent magnet 30' is broken and divided while being held by, for example, a single magnet-piece holding member 40.

In this case, the magnet pieces 31 to 34 may be those magnetized before the breaking and dividing. Alternatively, the magnet pieces 31 to 34 which are held by the magnet-piece holding member 40 after the breaking and dividing may be magnetized. In this case, the magnet pieces 31 to 34 do not magnetically attach to a rotor, for example, when inserted to the rotor. This makes the inserting operation easy.

In the method of manufacturing the field pole magnet 30, the field pole magnet is broken and divided into the multiple magnet pieces, and then the multiple magnet pieces obtained by the breaking and dividing are united and integrated together.

As in the manufacturing method of this embodiment, a scheme may be adopted in which: a single field pole magnet is broken and divided into multiple magnet pieces; and the multiple magnet pieces are assembled into the original field pole magnet. Alternatively, multiple magnet pieces obtained by previous breaking and dividing may be assembled into a single field pole magnet.

However, what is important in this case is as follows. In the case of the cutting division using, for example, a rotary blade, the single field pole can be reconstructed by freely assembling and interchangeably arranging the multiple magnet pieces. On the contrary, in the case of the breaking division, the assembling arrangement of the multiple magnet pieces obtained by the breaking division cannot be achieved by interchangeably arranging the multiple magnet pieces, and needs to be achieved by uniting these multiple magnet pieces together in a way that each two matching broken surfaces are in abutting contact with each other. This is because as shown in FIG. 4, each broken surface of each magnet piece has appropriate roughness, an uneven shape, and a large number of fine cracks on a top layer portion thereof, unlike a flat surface shape of a cut surface obtained by the cutting using a rotary blade or the like. In this case, it is preferable that the multiple magnet pieces should be united together in such a manner that the broken surfaces concerning each single division surface are in abutting contact with each other in the same directions as those before the division.

Meanwhile, in the case where a field pole magnet is cut and divided into magnet pieces by use of a rotary blade or the like, division surfaces of the magnet pieces have to be ground in order to reduce the dimensional error of the magnet pieces. This improves the smoothness of the division surfaces of the magnet pieces, but accordingly increases the contact area and decreases the contact resistance between adjacent magnet pieces. This leads to reduction in the heat generation suppressing effect obtained by the division of the magnet.

Meanwhile, in the above method, the broken surfaces constituting the division surface between each two magnet pieces are almost equivalent to those which are united together before the breaking. In addition, unlike in the case of the cutting division using, for example, a rotary blade in which removes cut portions as cut powder, no portion is removed as cut powder, and the contact resistance between each two adjacent magnet pieces accordingly increases. Thereby, eddy currents can be more securely isolated from each other between the magnet pieces. As a result, it is possible to further enhance the heat generation suppressing effect attributable to the division into the multiple magnet pieces.

The electric motor A according to one embodiment of the present invention enables suppressing eddy current loss of the field pole magnet 30 by use of a broken-divided inexpensive permanent magnet, the eddy current loss occurring in the use of the electric motor A. Thus, it is possible to provide a highly efficient electric motor A at low cost.

Suppressing the heat generation due to the eddy current loss of a magnet suppresses demagnetization of a permanent magnet and enables a larger current to flow to the stator. Thus, it is possible to obtain a further inexpensive electric motor which produces high output.

By use of commercially-available NdFeB sintered magnets (with an electrical resistivity of about 150 μΩm), Examples 1 to 4 as well as Comparative Examples 1 and 2 as shown in Table 1 and FIGS. 2 to 5 were produced. Table 1 shows comparison between Comparative Examples 1 and 2 and Examples 1 to 4 corresponding to the present invention.

TABLE 1

| Type | | Breaking Shape | Time needed for Integrating Operation |
|---|---|---|---|
| Comparative Example 1 | Cutting division by use of grindstone, and subsequently bonding with insulating paper interposed in between | — | It took 15 minutes, much of which was spent for application of an adhesive agent. |
| Comparative Example 2 | Breaking division, and subsequently bonding by use of an adhesive agent | Not split in target positions, and 350-kg load was needed for breaking. | It took 20 minutes, much of which was spent for application of the adhesive agent and alignment of broken surfaces. |
| Example 1 | Breaking division, and subsequently connection by use of an adhesive tape | Not split in target positions, and 350-Kg load was needed for breaking. | It took 10 minutes, much of which was spent for alignment of broken surfaces. |

TABLE 1-continued

| | Type | Breaking Shape | Time needed for Integrating Operation |
|---|---|---|---|
| Example 2 | Connection by attaching an adhesive tape to one side before breaking division; and connection by attaching an adhesive tape to the opposite side after the breaking division | Not split in target positions, and 350-Kg load was needed for breaking. | Operation was completed in 3 minutes since integration was able to be achieved by: aligning broken surfaces together by placement with the side, to which the tape was attached before the division, facedown; and attaching the tape to the opposite side. |
| Example 3 | Providing slits; subsequently connection by attaching an adhesive tape to a side opposite from a side in which the slits were provided; thereafter cutting division; and afterward connection by attaching an adhesive tape to the side in which the slits were provided | Successfully split in target positions, and load needed for breaking decreased to 70 kg. | Operation was completed in 3 minutes since integration was able to be achieved by: aligning broken surfaces together by placement with the side, to which the tape was attached before the division, facedown; and attaching the tape to the different side. |
| Example 4 | Providing slits; subsequently connection in a way that four surfaces perpendicular to planned division surfaces are covered with a tubular rubber; and thereafter breaking division | Successfully split in target positions, and load needed for breaking decreased to 70 Kg. | No operation time was required since broken surfaces were automatically aligned together by contraction of the rubber. |

As Comparative Example 1, a magnet with a length of 40 mm, a width of 30 mm and a thickness of 5 mm was produced by: cutting out four plate-shaped samples each with a length of 10 mm, a width of 30 mm and a thickness of 5 mm from a commercially-available NdFeB sintered magnet; and bonding the four samples together by use of an adhesive agent with insulating paper interposed in between.

In addition, plate-shaped samples each with a length of 40 mm, a width of 30 mm and a thickness of 5 mm were cut out from a commercially-available NdFeB sintered magnet, and each sample was divided into four pieces by breaking the sample at 10-mm intervals in the longitudinal direction. Five types of dividing and integrating operations were tested respectively for Comparative Example 2 and Examples 1 to 4 as illustrated in Table 1 (see FIGS. 7 to 11).

Figure 7:
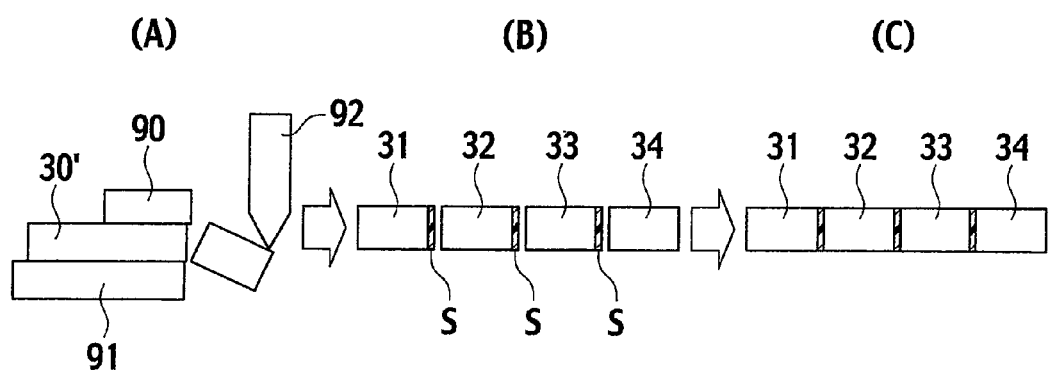
FIG. 7 is an explanatory drawing of a method of manufacturing a field pole magnet of Comparative Example 2.

FIGS. 7 to 11 are explanatory diagrams showing the manufacturing methods of Comparative Example 2 and Examples 1 to 4, respectively. The method of manufacturing a field pole magnet of Comparative Example 2 illustrated in FIG. 7 is as follows.

Firstly, as illustrated in (A), a permanent magnet 30' was held between upper and lower guides 90, 91, and then the breaking division was performed by punching portions, in which the magnet 30' was intended to be divided into pieces, by use of a punch 92.

Thereafter, as illustrated in (B), an adhesive agent s was applied to the broken surfaces of magnet pieces 31 to 34 obtained from the division. Subsequently, as illustrated in (C), the broken surfaces of the magnet pieces 31 to 34 were bonded together. Thereby, the field pole magnet of Comparative Example 2 was produced. In a case of fully insulating the broken surfaces, the multiple divided magnet pieces may be integrated together by uniting the magnet pieces together with an insulating member obtained by mixing an adhesive agent and non-conductive particles (such as glass beads or ceramic particles, for example) being an insulating inclusion and functioning as a spacer.

Figure 8:
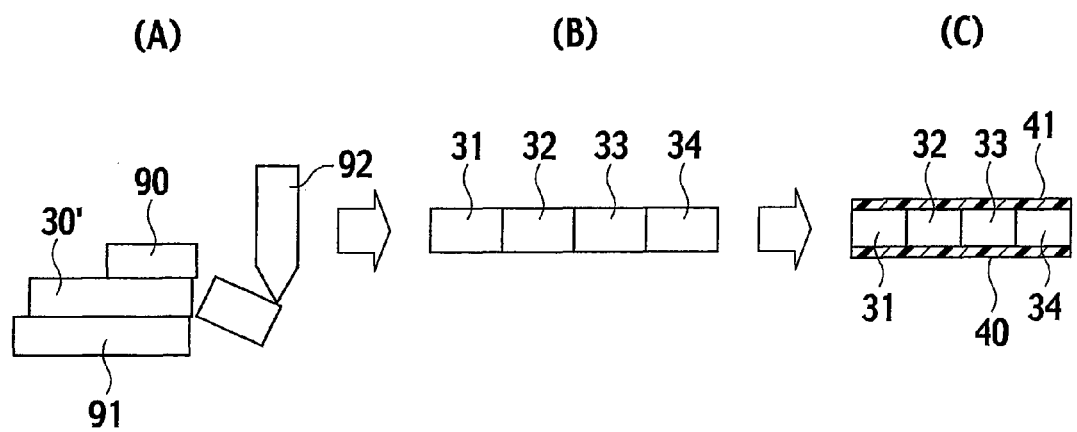
FIG. 8 is an explanatory drawing of a method of manufacturing a field pole magnet of Example 1.

The method of manufacturing a field pole magnet of Example 1 illustrated in FIG. 8 is as follows.

Firstly, as illustrated in (A), a permanent magnet 30' was held between upper and lower guides 90, 91, and the breaking division was performed by punching portions, in which the magnet 30' was intended to be divided into magnet pieces, with the punch 92.

Thereafter, as illustrated in (B), the broken surface of magnet pieces 31 to 34 obtained from the division were put in abutting contact with one another. Subsequently, as illustrated in (C), the magnet-piece holding members 40, 41 were attached to the upper and lower surfaces of the magnet pieces 31 to 34. Thereby, the field pole magnet of Example 1 was produced.

Figure 9:
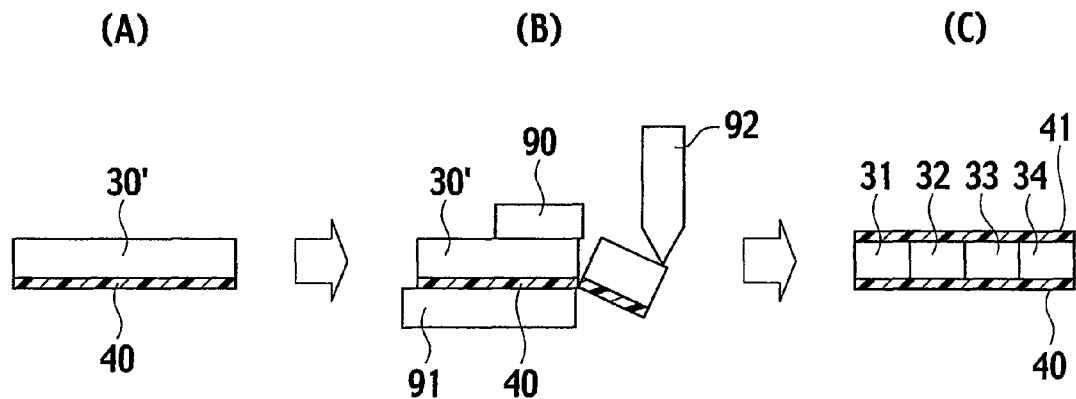
FIG. 9 is an explanatory drawing of a method of manufacturing a field pole magnet of Example 2.

The method of manufacturing a field pole magnet of Example 2 illustrated in FIG. 9 is as follows.

First of all, as illustrated in (A), the magnet-piece holding member 40 was attached to the lower surface of the permanent magnet 30'. Subsequently, as illustrated in (B), the resultant permanent magnet 30' was held between the upper and lower guides 90, 91, and then breaking division was performed by punching portions, in which the permanent magnet 30' was intended to be divided into magnet pieces, with the punch 92.

Thereafter, as illustrated in (C), the magnet-piece holding member 41 was attached to the upper surfaces of the respective magnet pieces 31 to 34 as well. Thereby, the field pole magnet of Example 2 was produced.

Figure 10:
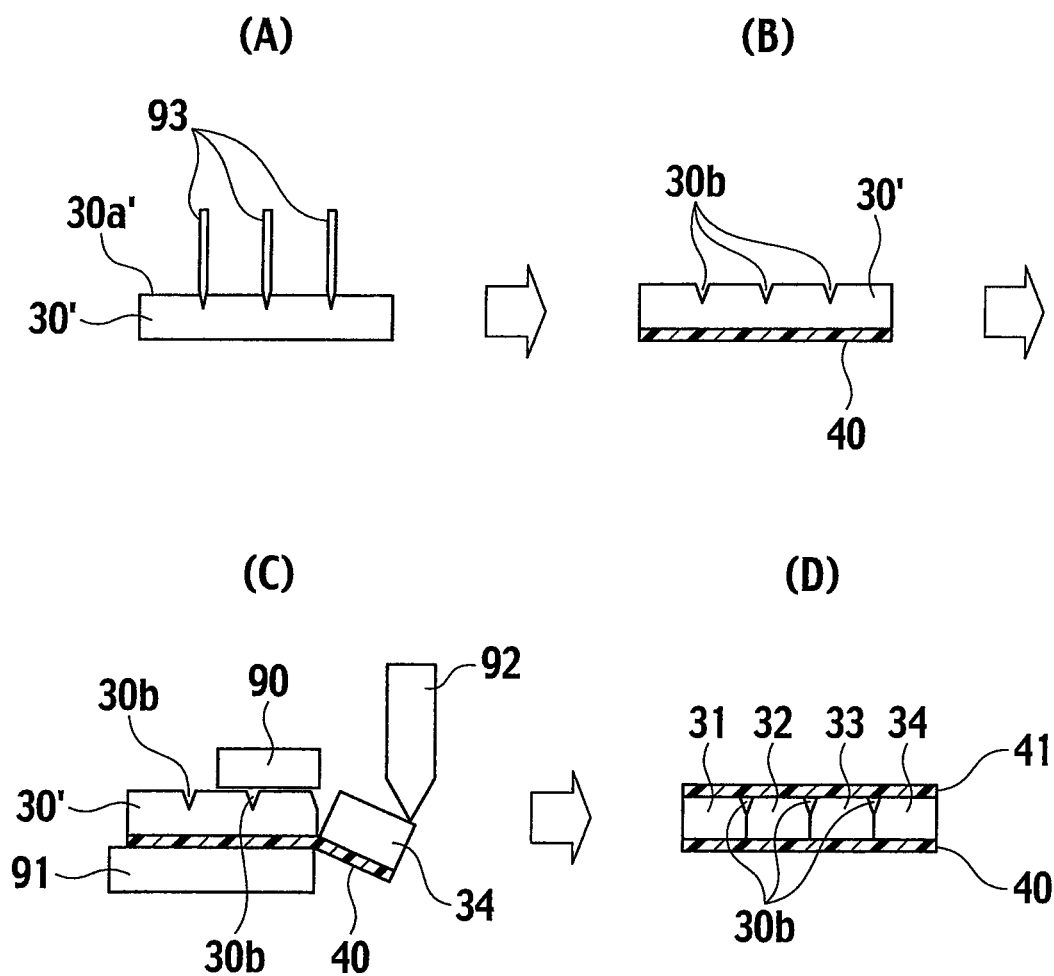
FIG. 10 is an explanatory drawing of a method of manufacturing a field pole magnet of Example 3.

The method of manufacturing a field pole magnet of Example 3 illustrated in FIG. 10 is as follows.

First of all, as illustrated in (A), slits 30b . . . were formed in the upper surface 30a' of the permanent magnet 30' at required intervals by use of glass cutters 93 . . . or the like.

As illustrated in (B), the magnet-piece holding member 40 was attached to the lower surface of the permanent magnet 30'. Subsequently, as illustrated in (C), the resultant permanent magnet 30' was held between the upper and lower guides 90, 91, and the breaking division was performed by punching portions, in which the permanent magnet 30' was intended to be divided into pieces, with the punch 92.

Thereafter, as illustrated in (D), the magnet-piece holding member 41 was attached to the upper surfaces of the respective magnet pieces 31 to 34. Thereby, the field pole magnet of Example 3 was produced.

The method of manufacturing a field pole magnet of Example 4 is as follows.

Figure 11:
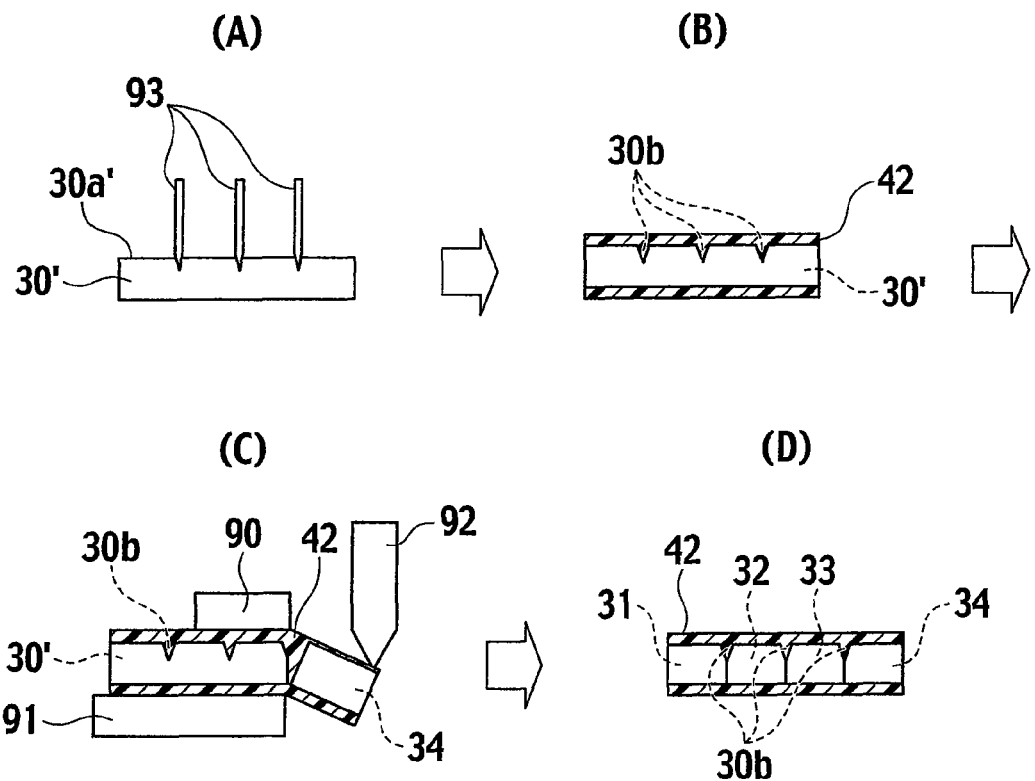
FIG. 11 is an explanatory drawing of a method of manufacturing a field pole magnet of Example 4.

The method of manufacturing a field pole magnet of Example 4 illustrated in FIG. 11 is as follows.

Firstly, as illustrated in (A), slits 30b . . . were formed in the upper surface 30a' of the permanent magnet 30' at required intervals by use of glass cutters 93 . . . . The slits may be formed by laser processing or by wire-cut electric discharge machining.

As illustrated in (B), the permanent magnet 30' is covered with a tubular magnet-piece holding member 42. Subsequently, the resultant permanent magnet 30' was held between the upper and lower guides 90, 91, as illustrated in (C), and the breaking division was performed by punching portions, in which the permanent magnet 30' was intended to be divided into pieces, by use of the punch 92.

Thereafter, as illustrated in (D), the magnet pieces 31 to 34 obtained by the breaking division returned to a state where the broken surfaces of the magnet pieces 31 to 34 were in abutting contact with one another with the elastic force of the magnet-piece holding member 42. In other words, the magnet pieces 31 to 34 collectively had almost the same dimension as did the permanent magnet 30'.

As for the field pole magnet of Comparative Example 2 shown in Table 1, a load of 350 kg was needed for each division, and the division surfaces had uneven shapes. As a result, a large number of cracks were observed thereon. In addition, the bonding was performed by use of a two-part epoxy-based adhesive agent. The integrating operation took 20 minutes, much of which was spent for the process of applying the adhesive agent to the uneven broken surfaces and for the process of aligning the divided broken surfaces together. Meanwhile, in the case where the multiple magnet pieces were united together by use of an insulating member with each two adjacent broken surfaces matched each other, the performance of positioning the magnet pieces to one another was improved since: the particles securely kept a state of being introduced in recessed portions of the rough broken surfaces; and thus each two adjacent magnet pieces were less likely to shift laterally relative to each other.

As for Example 1, a load of 350 kg was needed for each division, and the division surfaces had an uneven shape. As a result, a large number of cracks were observed thereon. Although much time was spent for the process of joining the divided broken surfaces, the operation time was reduced, and the operation was completed in 10 minutes, because the adhesive agent was not applied in exchange for the use of the adhesive tape.

As for Example 2, a load of 350 Kg was needed for each division, and the division surfaces had an uneven shape. As a result, a large number of cracks were observed thereon. However, the operation time was significantly reduced, and the operation was completed in 3 minutes, because: one side of the magnet was fixed by use of the adhesive tape before the division; thus, each two adjacent broken surfaces were aligned together in the same condition as before the division by placing the divided magnet pieces on a flat surface; and accordingly, only the attaching of the tape to the opposite side sufficed.

As for Example 3, since the slits were provided, a load needed for each division was reduced to 70 kg, which was about ⅕. In addition, since the broken surfaces were split along the slits, the broken surfaces were straight and had almost no cracks.

In addition, since one side of the magnet was fixed by use of the adhesive tape before the division, the operation for the magnet integration was completed in three minutes as in the case of Example 2.

As for Example 4, since the slits were provided, a load needed for each division was reduced to 70 Kg, which was about ⅕, as in the case of Example 3. In addition, since the broken surfaces were split along the slits, the broken surfaces were straight and had almost no cracks.

In addition, the tubular heat-shrinkable rubber was used to cover four sides, perpendicular to the broken surfaces, of the magnet, and the rubber was put into close contact with the magnet by shrinking the rubber at a temperature of 100° C. or higher. Thereby, the rubber having been elongated during the division of the magnet shrunk. Accordingly, the broken surfaces were aligned together, and returned to their original positions automatically in order of their split. This made the operation for the magnet integration unnecessary.

In addition, weathering tests were conducted on the magnets produced by use of the respective methods, where the magnets were left in a high-temperature high-humidity chamber at 80° C. and at a humidity of 90% for 1000 hours. As a result, it was observed in Comparative Example 1 that red rust occurred entirely on surface portions.

Further, it was observed in Comparative Example 2 that red rust occurred entirely on broken surfaces to which the adhesive agent was insufficiently applied, and on exposed surface portions.

In Examples 1, 2, and 3, since the two sides having the wider surface areas were protected by the adhesive tapes, rust was observed only slightly on the other sides and the broken surfaces.

In Example 4, rust was observed slightly on two sides covered with no rubber, but no rust was observed on the broken surfaces or on the four sides which were covered with the rubber and had the wide areas.

As to the magnets of Comparative Examples 1 and 2 as well as Examples 1 to 4, the contact resistance value in an interface between each divided magnet was measured (see Table 2). Table 2 shows comparison among the field pole magnets of Comparative Examples 1 and 2 as well as Examples 1 to 4 which are equivalent to the present invention in terms of the resistance measurement and the heat generation evaluation.

TABLE 2

| | Type | Resistance Value per Interface (mΩ) | Heat Evaluation: Temperature Increase after 60 seconds (° C.) |
|---|---|---|---|
| Comparative Example 1 | Cutting division by use of grindstone, and subsequently boding with insulating paper interposed in between | Un-measurable ∞ | 6 |
| Comparative Example 2 | Breaking division, and subsequently boding by use of an adhesive agent | 1.5 | 8 |
| Example 1 | Breaking division, and subsequently connection by use of an adhesive tape | 18 | 6 |
| Example 2 | Connection by attaching an adhesive tape to one side before breaking division; and connection by attaching an adhesive tape to the opposite side after the breaking division | 17 | 6 |
| Example 3 | Providing slits; subsequently connection by attaching an adhesive tape to a side opposite from a side in which the slits were provided; thereafter cutting division; and afterward connection by attaching an adhesive tape to the side in which the slits were provided | 12 | 6 |
| Example 4 | Providing slits; subsequently connection in a way that four surfaces perpendicular to planned division surfaces are covered with a tubular rubber; and thereafter breaking division | 13 | 6 |

As to Comparative Example 1, the contact resistance value was ∞, and the insulation was thus confirmed. As to Comparative Example 2, the contact resistance was 1.5 mΩ, and a slight higher temperature due to the heat generation was observed than in Comparative Example 1, probably because of the higher contact pressure between the magnet pieces with the contraction of the adhesive agent.

As to Examples 1 to 4, the contact resistance value was 5 mΩ or higher. When their heat generation statuses were checked by a test with the application of the AC magnetic field in an air-core coil, the result showed that their heat generation statuses were similar to that of Example 1 in which the magnet pieces were fully insulated from one another.

Figure 12:
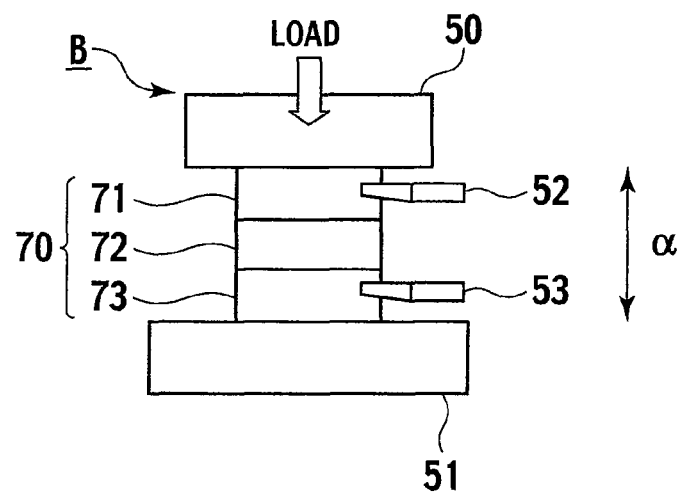
FIG. 12 is an explanatory drawing illustrating a principal part of a resistance measurement device for measuring an electric resistance value of the field pole magnet.
Figure 13:
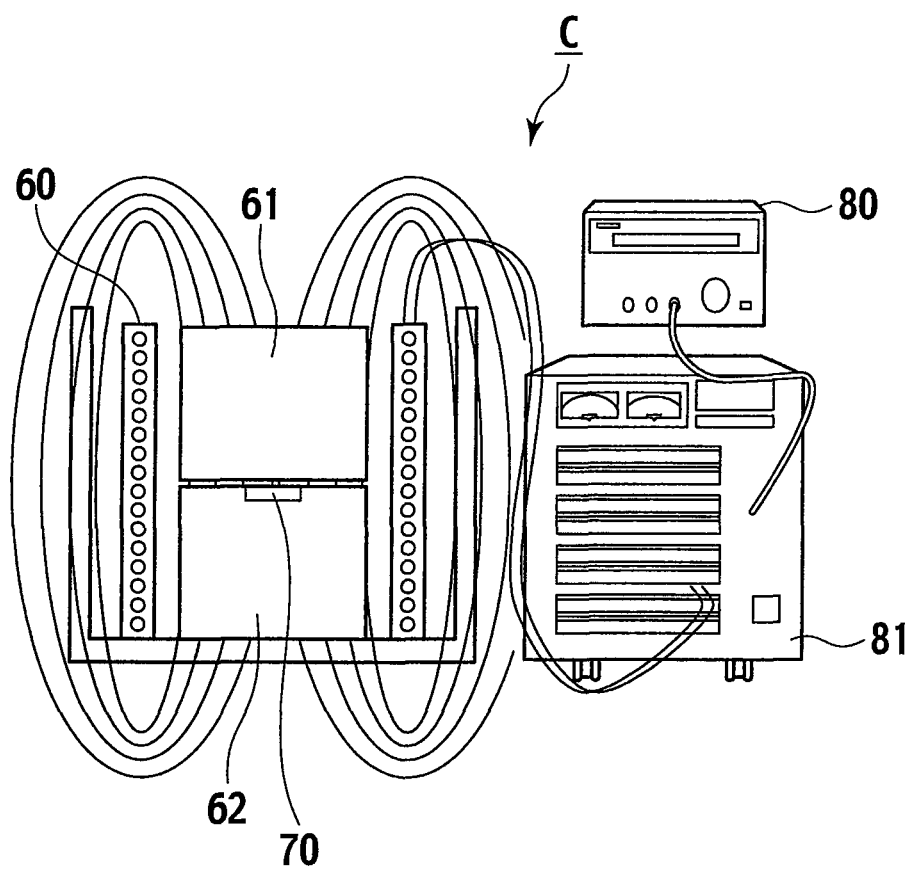
FIG. 13 is an explanatory drawing illustrating a configuration of a heat measuring device for measuring heat generation of the field pole magnet.

FIG. 12 is an explanatory drawing illustrating a principal part of a resistance measurement device for measuring an electric resistance value of the field pole magnet. FIG. 13 is an explanatory drawing illustrating a configuration of a heat measuring device for measuring heat generation of the field pole magnet.

A resistance measurement device B illustrated in FIG. 12 is an AC milliohm tester (manufactured by HIOKI E.E. Corporation) is configured to conduct measurement by a four-terminal method. The resistance measurement device B is configured to apply a load to a field pole magnet 70 interposed between jigs 50, 51 in a direction α orthogonal to the broken surfaces. The load can be set at an arbitrary value. The jigs 50, 51 and the field pole magnet 30 are insulated from each other. Lead terminals 52, 53 are connected to the magnet piece 31 and the magnet piece 34, respectively.

A heat measuring device C illustrated in FIG. 13 is a device configured to measure temperature increase in a surface of a sample (field pole magnet 30) by applying an AC magnetic field of 5 kHz and 6 mT to the field pole magnet 30 with the field pole magnet 30 disposed in a cylindrical air-core induction coil 60 while held and fixed between thermal insulators 61, 62. Meanwhile, a signal generator 80 generates required signals to be transmitted to the air-core induction coil 60. An amplifier 81 amplifies the required signals generated by the signal generator 80. A closed-end cylindrical case 82 contains the air-core induction coil 60, the field pole magnet 70, and the heat insulators 61, 62.

The measurements of the above-described electric resistance value and the heat were conducted while fixing each of the field pole magnets of Comparative Examples 1 and 2 as well as Examples 1 to 4 illustrated in Table 2 to the jigs and the like with its cut surfaces or broken surfaces opposed to each other, Examples 1 to 4 being equivalent to the present invention.

The afore-mentioned embodiments and Examples are merely examples described for the purpose of making the present invention easily understood. The present invention is not limited to the embodiments and Examples, but may be modified in various ways within the technical scope of the present invention. The present invention has been described above by taking, as an example, the case where the present invention is applied to an electric motor (IPM) having a so-called embedding structure where a field pole magnet is embedded in a rotor. The present invention, however, is also applicable to an electric motor having a surface magnet structure (SPM). It is a matter of course that the field pole magnet of the present invention may be installed not only in a rotor, but also in a stator and is further applicable to an electric generator as well.

Hereinabove, the case where the single permanent magnet is broken and divided into the four magnet pieces has been described as an example. However, a single permanent magnet may be broken and divided into five pieces or more, for example. In addition, although the case where the rectangular permanent magnet is broken and divided has been described as an example hereinabove, the present invention is not limited thereto, but is applicable to a permanent magnet or the like formed in a C shape or other different shapes, for example.

Further, the configuration where the magnet pieces arranged side by side are in abutting contact with each other while having their broken surfaces opposed to each other has been described hereinabove. However, a configuration where their broken surfaces are bonded to each other by an adhesive agent is also applicable. Thereby, it is possible to integrate the broken and divided magnet pieces together, and thus to easily insert the magnet pieces into the rotor or the like or to magnetize the magnet pieces.

The subject application claims the priority based on Japanese Patent Application No. 2008-257261 filed on Oct. 2, 2008, and the entire content thereof is incorporated herein by reference.

INDUSTRIAL APPLICABILITY

The present invention provides: a field pole magnet which enables reduction in production cost by simplifying a process of integrating magnet pieces together, and which requires no rust preventing process on broken surfaces; a method of manufacturing the field pole magnet; and a permanent-magnet rotary electric machine.

| | [Reference Signs List] |
| --- | --- |
| 10 | stator |
| 20 | rotor |
| 30, 30A, 30B | field pole magnet |
| 30' | single permanent magnet |
| 31 to 34 | magnet piece |
| 40 to 42 | magnet-piece holding member |
| A | permanent-magnet rotary electric machine |

The invention claimed is:

1. A method of manufacturing a field pole magnet in which a plurality of magnet pieces formed by breaking and dividing a single permanent magnet are arranged side by side, the method comprising:
   a holding step comprising holding the single permanent magnet by at least one magnet-piece holding member;
   a breaking and dividing step comprising a breaking and dividing process including breaking and dividing the single permanent magnet into the plurality of magnet pieces held by the at least one magnet-piece holding member; and
   a forming step comprising forming one field pole magnet so the plurality of magnet pieces obtained by the breaking and dividing process are united, while held by the at least one magnet-piece holding member, to have broken surfaces of the plurality of magnet pieces in abutting contact with each other.

2. The method of manufacturing a field pole magnet according to claim 1, further comprising bonding together the plurality of magnet pieces obtained by the breaking and dividing process.

3. The method of manufacturing a field pole magnet according to claim 1, further comprising integrating the plurality of magnet pieces obtained by the breaking and dividing process using an insulating member.

4. The method of manufacturing a field pole magnet according to claim 1, further comprising magnetizing the plurality of magnet pieces obtained by the breaking division and dividing process while holding the magnet pieces using the at least one magnet-piece holding member.

5. The method of manufacturing a field pole magnet according to claim 1, wherein
- the at least one magnet-piece holding member is formed in an elongated band shape to which the plurality of magnet pieces are attached, and
- the holding the single permanent magnet includes attaching the at least one magnet-piece holding member to the single permanent magnet.

6. The method of manufacturing a field pole magnet according to claim 1, wherein
- the single permanent magnet is rectangular parallelepipedic, and
- holding the single permanent magnet includes attaching the at least one magnet-piece holding member to at least one surface of the single permanent magnet perpendicular to broken surfaces of the plurality of magnet pieces.

7. The method of manufacturing a field pole magnet according to claim 1, wherein
- the single permanent magnet is rectangular parallelepipedic, and
- holding the single permanent magnet includes attaching the at least one magnet-piece holding member to all surfaces of the single permanent magnet perpendicular to broken surfaces of the plurality of magnet pieces.

\* \* \* \* \*